United States Patent
Nakagawa

[15] 3,656,765
[45] Apr. 18, 1972

[54] A DEVICE FOR SEALING A ROTATING SHAFT

[72] Inventor: Kennosuke Nakagawa, 95-1 chome Naumune, Tokyo, Japan

[22] Filed: Jan. 13, 1970

[21] Appl. No.: 2,475

[30] Foreign Application Priority Data

Jan. 23, 1969 Japan..................................44/4449

[52] U.S. Cl..............................................................277/81
[51] Int. Cl..........................................................F16j 15/02
[58] Field of Search..............................277/81, 93 SD, 96, 92

[56] References Cited

UNITED STATES PATENTS 2,247,505  7/1941  Kohler....................................277/81
2,740,648  4/1956  Amblard..............................277/81 X

FOREIGN PATENTS OR APPLICATIONS 1,307,861  9/1962  France..............................277/93 SD

*Primary Examiner*—Robert I. Smith
*Attorney*—Waters, Roditi, Schwartz & Nissen

[57] ABSTRACT

A device for sealing a rotating shaft under wide pressure ranges from extremely high vacuum up to extremely high pressure, in which a contact surface is formed between a sealing seat of washer configuration and the end of a rotating ring fixed to the rotating shaft, or the end of a fixed ring fixed to a gland. An O-ring and spring-holding washer are installed at the back side of the sealing seat and they are pressed by a spring, or liquid pressure so that the O-ring is pressed against the sealing seat.

8 Claims, 9 Drawing Figures

A DEVICE FOR SEALING A ROTATING SHAFT

SUMMARY OF THE INVENTION

In conventional mechanical seals, a thick rotating ring fixed to a rotating shaft is directly press-contacted by a spring, ro the fixed ring is press-contacted against the rotating ring in order to develop a pressure based on a minumum spring force because of unevenness of the repulsive force of the spring on each part of the end surface. Accordingly, it was mandatory to use a stronger spring than necessary to effect the seal and this is a decided deficiency. It is also very difficult in such device which utilizes the repulsive force of a spring to maintain a constant contact-pressure at the contact surface upon change of the spring repulsive force to cope with change of pressure on the high pressure side. Accordingly, when this mechanical seal was used under varying conditions of low to high pressures it must use a spring having a repulsive force to resist the highest allowable pressure to be applied to the contacting surface. Such compromise invites the deficiency of greater power than necessary and the output torque is reduced by the resulting increase in the contacting pressure.

The present invention seeks to eliminate such defects.

An object of the present invention is to provide a sealing device for a rotating shaft which allows complete sealing of the rotating parts by the formation of a contact surface by a seal seat, which is light weight and of thin washer configuration, bearing against the end surface of the rotating ring or of the fixed ring, which seat is press-contacted by a spring.

Another object of this invention is to provide a sealing device for a rotating shaft which obtains the sealing effect by the use of a spring of weak repulsive force by employing an o-ring installed at the back side of the sealing seat and by the installation of a spring-holding washer at the back side of said O-ring.

A further object of this invention is to provide a sealing device for a rotating shaft in which the O-ring not only serves as a pressure-equalizer but it also performs sealing action by intimate contact of said O-ring against the internal wall of an outer box or the surface around the rotating shaft.

A still further object of the present invention is to provide a sealing device for a rotating shaft which seals a rotating part by initimate contact of the O-ring against both walls of a double box member and by installation of a spring-holding washer at the back side of the box wall, which washer is pressed by the spring for press-contact of the sealing washer.

A still further object of the present invention is to provide a sealing device for a rotating shaft allowing sealing of the rotating part by press-contact of the sealing seat against the rotating ring by means of the pressure by a liquid stored in a reservoir, instead of by the repulsive force of a spring.

A still further object of the present invention is to provide a sealing device for sealing of a rotating shaft allowing to seal the rotating part by the press-contact of a sealing seat against the rotating shaft by an O-ring which is fitted at the opening of a liquid reservoir filled with a lubricating oil or the like, said reservoir being formed in a double cylindrical box body through which extends the rotating shaft.

A still further object of the present invention is to provide a sealing device for sealing of a rotating shaft enabling a seal of the rotating part while keeping constant pressure of the sealing part by the installation of a channelling hole in the outer cylinder of the aforesaid double cylinder box and by connecting the reservoir with a pressure regulation apparatus and effecting change of fluid pressure of the reservoir in correspondence with change of pressure at the high pressure side.

DETAILED DESCRIPTION

Figure 1:
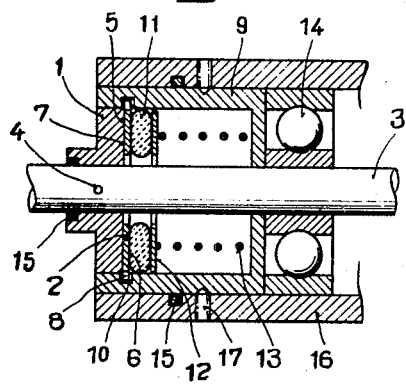
FIG. 1 is a vertical section of a seal of unbalancing type in which an O-ring is intimately fitted at the inner wall of an outside box.

FIG. 1 shows a rotating ring 1 fabricated from hard and abrasion resisting material such as steel or stainless steel etc., the degree of flatness of the facing surface 2 of the rotating ring 1 being extremely precise-finished. The ring 1 is fixed by a pin 4 to the rotating shaft 3. A sealing seat 6 is made of a material different from said rotating ring 1 such as bronze or phosphor-bronze or, of the same material but different in quenching degree. The seat 6 is thin and light-weight and of washer configuration, and the facing surface 5 thereof is extremely precise-finished. This sealing seat 6 is in contact with rotating ring 1 along contacting surface 7. The rotation of the sealing seat 6 is prevented by a tongue 8 which protrudes from seat 6 and fits into a groove 10 cut in an outer box 9. At the rear side of sealing seat 6, an O-ring 11 is installed whose periphery is in intimate contact with the inside wall of outer box 9, and a spring-holding washer 12 is installed at rear side of the O-ring 11. A spring 13 presses the sealing seat 6 against the rotating ring 1 through washer 12 and O-ring 11, thus seat 6 is pressed against ring 1 to seal the rotating parts. If necessary, an additional sealing seat made of another different material such as Teflon may be inserted between the rotating ring 1 and the sealing seat 6. In FIG. 1, numeral 14 indicates a bearing, 15 a packing, and 17 a fixing pin which fixes gland 16 to the outer box 9.

Figure 2:
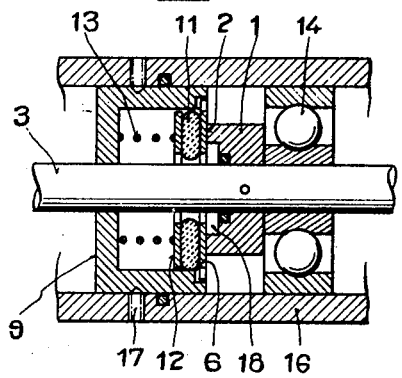
FIG. 2 is a vertical section of a seal of balanced type in which a recess is formed in the end surface of rotating ring for sealing of a rotating shaft.

FIG. 2 shows a seal of pressure-balancing type for the rotating shaft in which, a grooved part 18 is mounted at the inner edge of the facing surface 2 of the rotating ring 1, thus allowing application of the pressure onto the back face of the sealing seat 6.

Figure 3:
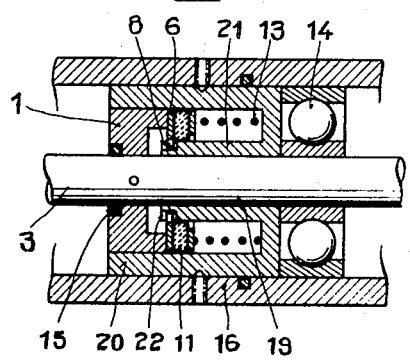
FIG. 3 is a vertical section of a sealing device in which a minute clearance is made between the rotating shaft and the end of an inner cylinder of a double cylindrical box body.

In FIG. 3, the outer box 9 of the FIG. 2 embodiment is disposed in a double cylindrical box body 20 having a central bore 19 receiving shaft 3 and O-ring 11 is contacted by both walls of the double box body. Tongue 8 which protrudes from the sealing seat 6 is fitted in groove 22 cut in the terminal edge of inner cylinder 21, for sealing of the rotating shaft.

Figure 4:
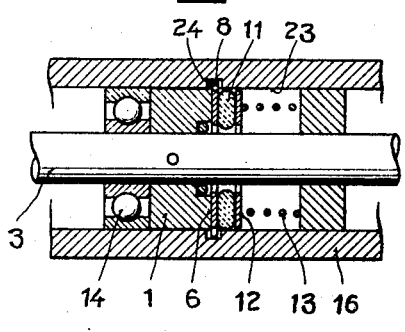
FIG. 4 is a vertical section of a seal of balancing type in which the outer box of the seal of balancing type as shown by FIG. 2 is removed, and the O-ring is directly in contact with the inside wall of a gland.

In FIG. 4, the outer box 9 of FIG. 2 is removed, and instead O-ring 11 is in direct contact with the inside wall 23 of gland 16, and tongue 8 which protrudes from sealing seat 6 is fitted in a groove 24 cut in the gland 16, to provide a balancing type seal for the rotating shaft.

Figure 5:
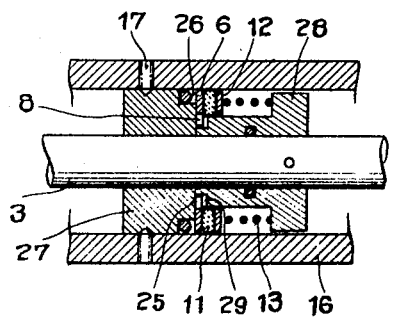
FIG. 5 is a vertical section of a seal balancing type in which an O-ring is in contact with the outside wall of a spring-holding collar fixed to the rotating shaft, and the O-ring is positioned at the back side of the sealing seat which faces the end surface of the fixing ring.

FIG. 5 shows a sealing of the rotating shaft of balancing type in which a ring 27 is fixed to gland 16 by means of pin 17, said fixed ring 27 being made of the same material as rotating ring 1 and having a stepped part 26 at the peripheral edge of the facing surface 25. Sealing seat 6 faces part 26 and a spring-holding collar 28 fixed to the rotating shaft 3. The tongue 8 of the sealing seat 6 is fitted in a groove 29 cut at the terminal edge of the collar 28. The O-ring 11 is clamped between seat 6 and a washer 12 installed at back side of O-ring 11, and a spring 13 presses the sealing seat 6 towards the fixed ring 27.

Figure 6:
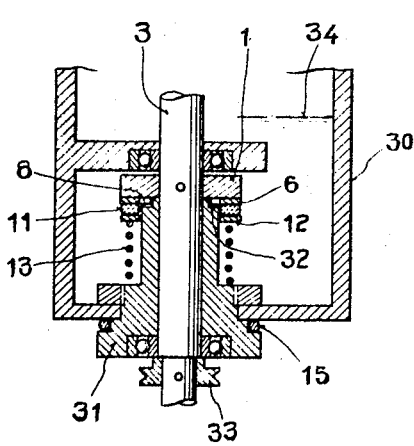
FIG. 6 is a vertical section of a seal of unbalanced type in which an O-ring is in contact with the outside wall of a rotating shaft-holding cylinder fixed to a tank, and the sealing seat is press-contacted against a rotating ring fixed to the rotating shaft.

FIG. 6 shows a seal for a rotating shaft of unbalanced type, in which, the rotating shaft 3, to which rotating ring 1 is fixed, passes through receiving box 31 fixed to a tank 30, and the sealing seat 6 is in contact with rotating ring 1. Tongue 8 of the sealing seat 6 is fitted in groove 32 cut at the terminal edge of receiving box 31, and O-ring 11 and washer 12 are installed at the back side of the sealing seat 6. This spring 13 presses the sealing seat 6 towards the rotating ring 1. In this figure, numeral 33 is a pulley, and 34 indicates liquid filled in tank 30.

Figure 7:
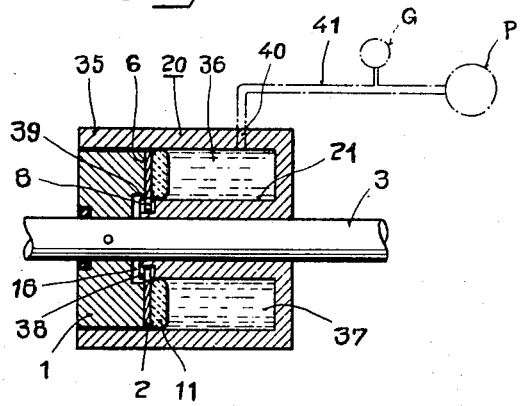
FIG. 7 is a vertical section of a seal in which liquid is filled in a reservoir of a double cylindrical box body and an O-ring seals the opening, the sealing seat being in contact with the rotating ring by means of liquid pressure.
Figure 8:
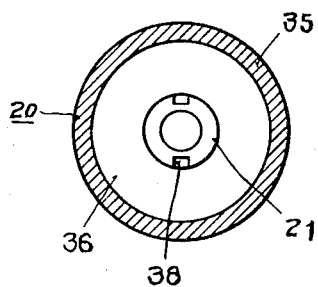
FIG. 8 is a front section of the double cylindrical box body of FIG. 7.
Figure 9:
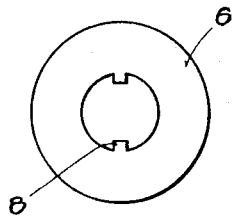
FIG. 9 is a front elevation of a sealing seat.

FIG. 7 shows a seal for a rotating shaft in which, a reservoir 36 is formed in the clearance between outer cylinder 35 and inner cylinder 21 of a double cylindrical box body 20, and O-ring 11 is fitted at the opening therein. A liquid 37 such as a lubricating oil or vacuum oil etc. is filled in reservoir 36 and acts as a spring in the manner of spring 13 in FIGS. 1–6. The sealing seat 6 is in contact with the rotating ring 1 fixed to the rotating shaft 3 and tongue 8 of seat 16 is fitted in a groove 38 cut at the end of inner cylinder 21. The end of the inner cylinder 21 is fitted in a recess 18 in facing surface 2 of the rotating ring 1, with minute clearance so that the pressure on the high pressure side at the periphery of the rotating shaft 3 can be minimized to act on the sealing seat 6 and is so constructed, that the fluid pressure 37 can act as a repulsive force which presses the sealing seat 6 towards the rotating ring 1.

The pressure of the liquid 36 can be changed correspondingly to the change of pressure of the high pressure side by the installation of a channelling hole 50 in the outer cylinder 35 and by the use of connecting pipe 41 which connects the liquid reservoir 36 with a pressure-regulating device P such as a pump installed externally and separatedly from the sealing device. G indicates a pressure gauge.

By virtue of the arrangement of the O-ring at the back side of the sealing seat, the unbalanced pressing force is distributed to the terminal edge of the spring evenly to every part of the O-ring through the intermediary of the spring-holding washer, and the pressing force of the spring can be evenly balanced further and transferred to the sealing seat by the addition of the elastic repulsive force by the O-ring. Also this allows the press-contact of every part of the facing surface of the sealing seat against the rotating ring or the fixed ring always with balanced pressing force to maintain the lubricating surface in a state of marginal lubrication, and, this eliminates the use of an unnecessarily powerful spring for the repulsive spring force, and accordingly, this allows the use of a weaker spring than that used in the conventional mechanical seal while achieving the sealing effect. Also, in the embodiment of this invention in which the pressure contact of the sealing seat against the rotating ring is made by the pressing force of a liquid instead of the aforesaid spring, the sealing seat is pressed against the rotating ring by means of the pressure of the liquid filled in the reservoir of the double cylindrical box body resulting in even action of the pressing force to every part of the sealing seat. Furthermore, this device allows easy control of the pressure by connecting the reservoir with the pressure-regulation apparatus which is installed separately outside of the device, and accordingly, the force of the pressure of the sealing seat with the rotating ring can be always kept constant by the control of the liquid pressure to correspond to the change of pressure of the high pressure side. Also, a minute clearance is formed to give no obstruction to the rotation by fitting the end edge of the inner cylinder into a recess in the recess in the rotating ring, which clearance allows the pressure entering from the high pressure side through the periphery of the rotating shaft to act on the sealing seat through said minute clearance. Thus, the pressure acting area is very minute and therefore, the influence is very little. Accordingly, the pressure regulation apparatus to be installed outside of the device becomes minimum in effect. Also, the sealing seat is constructed in washer configuration of thin and light weight material, therefore, this allows rapid accommodation to fluctuations in the thrust direction because of this efficient accommodation to minute errors in the flatness of the rotating ring or the fixed ring, resulting in uniform contact with the facing surface.

The sealing apparatus of the present invention can be widely accommodated in a range of pressure from extreme high vacuum up to extreme high pressure as great as 300–1,000 kg per sq. cm. The sealing apparatus of the present invention is applicable in many fields such as, for instance, space development such as artificial satellites and rockets, deep sea development such as submarines, deep marine drilling machines, and propelling shafts for ships, and furthermore, construction machinery such as rock drilling machines.

What is claimed is:

1. Apparatus for the sealing of a rotating shaft, said apparatus comprising a rotatable ring coupled to the shaft to rotate therewith, a fixed ring, a sealing seat of washer configuration having one surface facing one of said rings, an O-ring at the opposite surface of said sealing seat, and means pressing said O-ring against said opposite surface of said sealing seat to form a contacting surface to seal the rotating part, said sealing seat being relatively thin and of metal to provide a flexibility so that uniform pressure is applied to the ring facing the seat to provide tight and uniform sealing between the rotatable and fixed rings.

2. Apparatus as claimed in claim 1 wherein said means pressing said O-ring against said sealing seat comprises a spring, a washer being interposed between said spring and seat.

3. Apparatus as claimed in claim 1 wherein said O-ring is deformed by said means and is pressed against the fixed ring in intimate sealing contact therewith.

4. Apparatus as claimed in claim 1 wherein said sealing seat includes a radially projecting tongue, said fixed ring having a groove receiving said tongue and preventing relative rotation between said sealing seat and fixed ring.

5. Apparatus as claimed in claim 1 wherein said fixed ring comprises a cylindrical box member including inner and outer cylindrical bodies, said inner cylindrical body having a bore in which said rotating shaft is rotatably received, said O-ring being in sealing contact at the inner and outer peripheries thereof with said inner and outer cylindrical bodies respectively.

6. Apparatus as claimed in claim 5 wherein said means pressing said O-ring against said seat comprises a chamber between said inner and outer cylindrical bodies and closed by said O-ring, and means for pressurizing said chamber with a fluid.

7. Apparatus as claimed in claim 6 wherein the pressurizing means comprises a reservoir for said fluid, and a pressure regulation apparatus connected to said reservoir.

8. Apparatus as claimed in claim 1 wherein said sealing seat is constituted of a material different from that of said rings.

* * * * *

UNITED STATES PATENT OFFICE
CERTIFICATE OF CORRECTION

Patent No. 3,656,765      Dated April 18, 1972

Inventor(s) Kennosuke Nakagawa

It is certified that error appears in the above-identified patent and that said Letters Patent are hereby corrected as shown below:

On the cover sheet [72], "95-1 chome Naumune," should read -- 95, 1-Chome, Narimune, Suginami-ku, -- .

Signed and sealed this 19th day of December 1972.

(SEAL)
Attest:

EDWARD M. FLETCHER, JR.      ROBERT GOTTSCHALK
Attesting Officer      Commissioner of Patents